July 8, 1924.
W. R. HESLEWOOD ET AL
1,500,705
PISTON RING
Filed Feb. 20, 1922
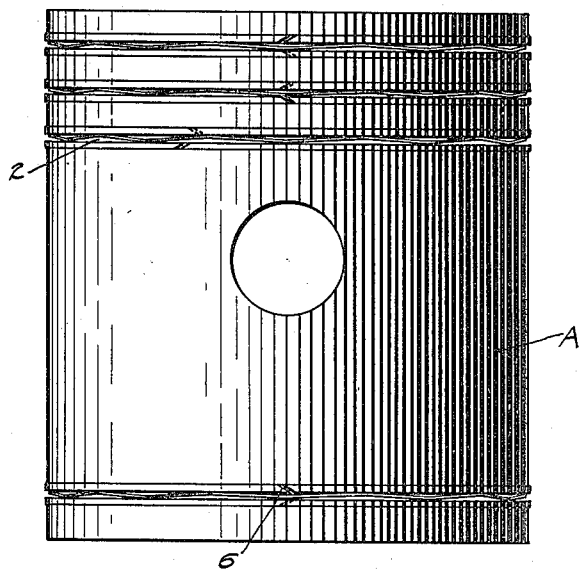
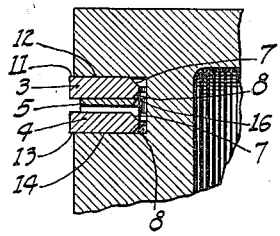
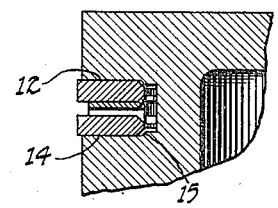
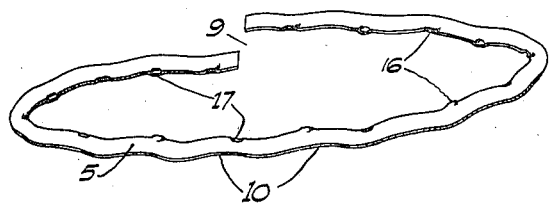
Inventor
WILLIAM R. HESLEWOOD.
HARRY F. MOCINE.
By Chas. E. Townsend
Attorney Patented July 8, 1924.

1,500,705

UNITED STATES PATENT OFFICE.

WILLIAM R. HESLEWOOD AND HARRY F. MOCINE, OF OAKLAND, CALIFORNIA, ASSIGNORS TO M. & H. PISTON RING CO., OF OAKLAND, CALIFORNIA, A CORPORATION OF NEVADA.

PISTON RING.

Application filed February 20, 1922. Serial No. 537,690.

*To all whom it may concern:*

Be it known that we, WILLIAM R. HESLEWOOD and HARRY F. MOCINE, citizens of the United States, residing at Oakland, in the county of Alameda and State of California, have invented new and useful Improvements in Piston Rings, of which the following is a specification.

This invention relates to a piston ring and particularly to that type known as multiple piece or leakproof rings.

One of the objects of the present invention is to provide a simple, substantial and cheaply manufactured piston ring especially adapted for pistons such as employed in internal combustion engines and the like, and particularly a piston ring which will not only reduce leakage to a minimum, but which will also, practically speaking, stop all transfer of lubricating oil from the crank case to the combustion chamber.

Another object of the invention is to provide a piston ring consisting of two independent rings placed one above the other and interspaced; said rings being split to permit circumferential expansion and having a spring expansion or separating ring placed between the same so as to maintain snug engagement with the upper and lower walls of the piston groove.

Another object of the invention is to provide means for locking the superposed rings and the expansion ring against turning movement with relation to each other, and also to secure the expansion ring against circumferential expansion beyond predetermined limits; further to so design the superposed rings that reversal, whether accidental or intentional, may be permitted without interfering with the proper functioning of the same.

Other objects will hereinafter appear.

The invention consists of the parts and the construction, combination and arrangement of parts as hereinafter more fully described and claimed, having reference to the accompanying drawings, in which—

Fig. 1 is a side elevation of a standard form of piston showing the application of the piston rings.

Fig. 2 is an enlarged fragmentary sectional view of a piston showing the rings in position.

Fig. 3 is a similar enlarged sectional fragmentary view of a piston showing a piston ring groove which has been worn.

Fig. 4 is a perspective view of the expansion ring which is interposed between the superposed rings.

Referring to the drawings in detail, A indicates a standard form of piston, and 2 the piston ring grooves formed therein. The piston ring forming the subject matter of the present invention consists of two separated rings such as indicated at 3 and 4. These rings are placed one above the other and are interspaced by means of a spring expansion ring such as indicated at 5, see Fig. 4. By referring to Fig. 2, it will be seen that a piston ring assembly consists of the two superposed rings 3 and 4, and a separating or expansion member, to-wit, the spring expansion ring 5, which is placed between the same; a set of rings so assembled being placed in each piston ring groove. The rings 3 and 4 are identical in construction, each ring being fairly thin and split, as at 6, to permit circumferential expansion. These rings are furthermore beveled on their inner edges as indicated at 7 and 8 for purposes hereinafter to be described. The spring expansion ring interposed between the ring sections 3 and 4, is preferably constructed of a flat strip of spring steel, such as shown in Fig. 4, and it is ring shaped and split as indicated at 9 to permit circumferential expansion. It is furthermore pressed or bent to form a wave-like or corrugated surface 10 to exert an upward pressure on the ring 3, and a downward pressure on the ring 4 when placed between the same. This is an important feature of the present invention as it maintains the upper surface 11 of the ring 3 in close contact with the upper wall 12 of the piston groove, and similarly the lower face 13 of the ring 4 in close contact with the lower seat 14 of the piston groove; gas or oil leakage around the rings being in this manner, practically speaking, eliminated.

In actual practice we have found that single piece piston rings, such as ordinarily employed, have a tendency to wear not only on their outer surface which contacts with the cylinder wall, but also on their lower and upper faces which contact with the upper and lower walls 12 and 14 of the piston groove. The latter wear is caused by the reciprocal movement of the piston, that is the piston rings tend to drag to a more or less extent and they therefore snugly engage the upper wall of the piston groove when the piston is travelling downwardly, and conversely the lower wall of the piston groove when the piston is travelling upwardly. A slight reciprocal movement is thus transmitted which gradually increases as wear takes place. The piston ring proper therefore becomes thinner and thinner due to wear, and the seats indicated at 12 and 14 similarly wear and become grooved or offset as indicated at 15.

We have further found that the moment any play of the character described begins to take place, a slight pumping action is created in each piston ring groove, and that oil is transferred upwardly around the rings, due to this pumping action; this oil being finally transferred to the combustion chamber of the engine where it causes trouble by fouling the plugs and by forming carbon, etc. Such oil leakage is, practically speaking, entirely overcome in the present instance as each section of the present ring here illustrated is always maintained in snug engagement with the respective walls of the piston groove, regardless of the movement or the speed of the piston; gas leakage is similarly reduced and greater efficiency, power output, etc., is obtained from an engine; a marked saving in lubricating oil being at the same time noticed.

For the purpose of further preventing oil transfer and gas leakage, it is more or less essential that the split portions of the rings 3 and 4, as indicated at 6, be maintained out of alignment with relation to each other. This is accomplished in the present instance by nicking the inner edge of the expansion ring 5 as indicated at 16. These nicked portions of the expansion rings engage the inner beveled faces 7 and 8 of the superposed rings, and also the gapped or split portion of each ring, that is the gap 6 in one ring will engage one nicked portion 16, while the gap 6 of the adjacent ring will engage another nicked portion 16 of the ring. The two rings, together with the expansion ring, are thus locked against turning movement with relation to each other and aligning of the split portions or gaps 6 is prevented. The nicking or striking of the inner edge of the ring serves another function, to-wit, that of limiting circumferential expansion of the ring 5. This is essential as the ring 5 is constructed of spring steel and might in time score the cylinder surface, if it should expand and come in contact therewith. Such a contact is however prevented as the nicked portions 16 will engage the inner beveled faces 7 and 8 of the superposed rings and thus prevent circumferential expansion beyond a predetermined limit.

Bevelling of the superposed rings, as indicated at 7 and 8, is of further importance as it permits installation of the present ring in an old piston, even though the ring grooves be considerably worn and recessed as indicated at 15, in Fig. 3. For instance offset faces formed, as indicated at 15, will not affect the installation of the ring forming the subject matter of this invention as the bevelled portions of the rings will take care thereof, thus avoiding the necessity of placing the old piston in a lathe and returning the ring grooves.

In conclusion it might be stated that the nicked portions 16 of the ring 5 are reversed with relation to each other, that is each alternate nicked portion will turn upwardly as indicated at 16, in Fig. 2, while each intermediate nicked portion will turn downwardly as indicated at 17, see Fig. 4. This is also of considerable importance as uniform contact and engagement will thus be maintained between the expansion ring and the superposed rings 3 and 4.

While certain features of the present invention are more or less specifically illustrated, we wish it understood that various changes in form and proportion may be resorted to within the scope of the appended claims, similarly that the materials and finish of the several parts employed may be such as the experience and judgment of the manufacturer may dictate or various uses may demand.

Having thus described our invention, what we claim and desire to secure by Letters Patent is—

1. A piston ring of the character described comprising a pair of superposed split circumferentially expansible rings and an expansion ring interposed between said rings, said expansion ring being vertically expansible and split to permit circumferential expansion and having means for engaging the superposed rings in the split portion thereof to prevent relative circumferential movement of the rings.

2. A piston ring of the character described comprising a pair of superposed split circumferentially expansible similar reversible rings having flat upper and lower faces, and a spring expansion ring interposed between the same, said ring being constructed of flat spring material and being split and presenting a corrugated surface to permit vertical and circumferential expansion and having means for engaging the superposed rings in the split portions thereof to prevent relative circumferential movement of the rings.

3. The combination with a piston having a piston ring groove formed therein, of a split piston ring adapted to be received by the groove, and an expansion ring also insertible in said groove, said expansion ring being flat and split and presenting a wave or corrugated surface to exert vertical pressure on the piston ring and to permit circumferential expansion and provided with means for engaging the piston ring in the split portion thereof to prevent relative circumferential movement and for engaging the said piston ring at the inner periphery thereof to limit the expansion of the said expansible ring.

4. An expansion ring for piston rings, said ring consisting of a ring which is flat in cross section and split to permit circumferential expansion, said ring also presenting a wave or corrugated surface to permit vertical expansion and provided with upwardly and downwardly projecting means arranged to engage an expansible piston ring at the split portion thereof and also at the inner periphery.

5. A piston ring of the character described comprising a pair of superposed split circumferentially expansible piston rings, a ring interposed between said rings, said ring being vertically and circumferentially expansible, and means on said ring for engaging the piston rings at the split portions thereof for securing the first named rings against turning movement with relation to each other.

6. A piston ring of the character described comprising a pair of superposed circumferentially expansible piston rings, an expansion ring interposed between said rings, said expansion ring being vertically expansible and split to permit circumferential expansion, and means projecting upwardly and downwardly for engaging the inner peripheries of the piston rings for limiting circumferential expansion of said ring.

7. A piston ring of the character described comprising a pair of superposed split circumferentially expansible piston rings, an expansion ring interposed between said rings, said ring being constructed of spring steel and being split and presenting a corrugated surface to permit vertical and circumferential expansion, and a common means carried by said last named ring for engaging the split portions of the piston rings for securing the superposed and the last named ring against turning movement with relation to each other and for also engaging the inner peripheries of the piston rings for limiting circumferential expansion of the interposed ring.

8. A piston ring of the character described comprising a pair of superposed circumferentially expansible rings, a flat steel ring interposed between the superposed rings, said steel ring being split and presenting a wave like corrugated surface to cause separation of the superposed rings, a bevelled surface formed on the inner edge of each superposed ring, and means on the interposed ring securing all the rings against turning movement with relation to each other, and also for engaging the said beveled surfaces for limiting circumferential expansion of the interposed ring.

9. A piston ring of the character described comprising a pair of superposed circumferentially expansible rings, a flat steel ring interposed between the superposed rings, said steel ring being split and presenting a wave like corrugated surface to cause separation of the superposed rings, a bevelled surface formed on the inner edge of each superposed ring, and a series of nicked portions formed on the inner edge of the flat steel ring, alternately engaging the bevelled inner edges of the superposed rings, said nicked portions securing all three rings against turning movement with relation to each other, and also limiting circumferential expansion of the flat steel ring.

10. A piston of the character described comprising a pair of superposed circumferentially expansible rings, an expansion ring interposed between said rings, said expansion ring being vertically expansible and split to permit circumferential expansion and provided with upwardly and downwardly projecting portions, and opposed bevelled surfaces formed on the inner side of each superposed ring and engaged by the said upwardly and downwardly projecting portions to limit the circumferential expansion of the said expansion ring.

11. A spring for a packing ring, comprising an annular body provided with corrugations and with angular packing ring seats on the high points of these corrugations.

12. In combination, a pair of piston rings, and an annular spring provided with corrugations and with an angular seat on the high point of each of these corrugations and disposed alternately on each side of this spring, and said seats adapted to engage one side and the inner circumferential surface of each of said piston rings and adapted to exert a lateral and a radial pressure on both of said piston rings.

WILLIAM R. HESLEWOOD.
HARRY F. MOCINE.